United States Patent
Yen et al.

(10) Patent No.: US 10,437,609 B1
(45) Date of Patent: Oct. 8, 2019

(54) INTELLIGENT PLATFORM

(71) Applicant: devicebook Inc., Bellevue, WA (US)

(72) Inventors: Wei Yen, Bellevue, WA (US);
Raymond Lo, Bellevue, WA (US);
Wingshun Ho, Bellevue, WA (US);
Sourabh Ladha, Bellevue, WA (US);
John Masin, Bellevue, WA (US)

(73) Assignee: devicebook Inc., Bellevue, WA (US)

( * ) Notice: Subject to any disclaimer, the term of this patent is extended or adjusted under 35 U.S.C. 154(b) by 135 days.

(21) Appl. No.: 15/454,893

(22) Filed: Mar. 9, 2017

(51) Int. Cl.
*G06F 9/445* (2018.01)
*G06F 21/62* (2013.01)

(52) U.S. Cl.
CPC ...... *G06F 9/44505* (2013.01); *G06F 21/6218* (2013.01)

(58) Field of Classification Search
CPC .................. G06F 9/44505; G06F 21/6218
USPC .............. 700/28; 711/170; 718/1; 370/216
See application file for complete search history.

(56) References Cited

U.S. PATENT DOCUMENTS

| | | | | |
|---|---|---|---|---|
| 2006/0259785 | A1* | 11/2006 | Thibadeau | G06F 21/80 713/193 |
| 2009/0097397 | A1* | 4/2009 | Moreira Sa de Souza | H04L 41/0636 370/216 |
| 2010/0106262 | A1* | 4/2010 | Schreyer | G06F 9/54 700/28 |
| 2011/0119669 | A1* | 5/2011 | McRae | G06F 9/45558 718/1 |
| 2012/0311290 | A1* | 12/2012 | White | G05B 23/0264 711/170 |
| 2015/0205977 | A1* | 7/2015 | Rundle | G06F 21/6218 707/781 |
| 2016/0188898 | A1* | 6/2016 | Karinta | G06F 17/30221 726/4 |
| 2016/0306628 | A1* | 10/2016 | Bestfleisch | G06F 8/71 |
| 2017/0005515 | A1* | 1/2017 | Sanders | H02J 3/381 |
| 2017/0005856 | A1* | 1/2017 | Thomas | H04L 67/32 |
| 2017/0206025 | A1* | 7/2017 | Viswanathan | H04L 67/1097 |
| 2017/0286910 | A1* | 10/2017 | Botterill | G06Q 10/103 |
| 2017/0302701 | A1* | 10/2017 | Phanse | H04L 63/20 |
| 2018/0109625 | A1* | 4/2018 | Jayaraman | H04L 67/141 |
| 2018/0211029 | A1* | 7/2018 | Ryu | G06F 21/6218 |

FOREIGN PATENT DOCUMENTS

EP     1 276 035 A2    1/2003

OTHER PUBLICATIONS

International Search Report and Written Opinion of the International Searching Authority dated Jun. 22, 2018, issued in related International Patent Application No. PCT/US2018/021641.
Citius Minds, "The IP of Iot—Top 5 Companies and how their IP Pans out," Dec. 2016, 24 pages.
Fortino, Giancarlo, et al., "Interoperability in the Internet of Things," Computing Now, Dec. 2016, 5 pages.

* cited by examiner

Primary Examiner — Aurel Prifti
(74) Attorney, Agent, or Firm — Nixon & Vanderhye P.C.

(57) ABSTRACT

An Intelligent Platform ("IP") comprises a Platform that employs an instance of a Software Defined Device (I-SDD) such that the Values of a set of Variables in an I-SDD shall reflect the Device State of interest at any given time. Whenever the Value of a Variable in I-SDD is changed, it could cause the Device to change to a different Device State.

21 Claims, 9 Drawing Sheets

FIG. 6
Platform SDD Publishing

FIG. 5
Platform Process

INTELLIGENT PLATFORM

CROSS-REFERENCE TO RELATED APPLICATIONS

None.

STATEMENT REGARDING FEDERALLY SPONSORED RESEARCH OR DEVELOPMENT

None.

FIELD

This technology relates to an Intelligent Platform.

BACKGROUND & SUMMARY

There is a need for an Intelligent Platform that models and mirrors different Devices in software. The following are some non-exhaustive advantageous features of non-limiting embodiments:

In one example non-limiting embodiment, an Intelligent Platform ("IP") comprises a Platform that employs an I-SDD where the Values of a set of Variables in an I-SDD shall reflect the Device State of interest at any given time and vis versa so that whenever the Value of a Variable in the I-SDD is changed, it could cause the Device to change to a different Device State. In this context, an I-SDD is an instantiation of a SDD, or an instantiation of the Device Data Representation of a SDD, of a particular Device. In this context, a Software-Defined Device ("SDD") means a computer software representation, to a User, of a Device, or of a subset of a Device, or of a derivative of a Device, or of an abstraction of a Device, in such a way that computer programs can use, reference, and interpret.

In some non-limiting embodiments, a Device could have one SDD or more than one SDD.

In some non-limiting embodiments, a SDD could be an abstraction of another SDD of the same Device, or a group of SDDs of several Devices.

In some non-limiting embodiments, the IP allows more than just a 1st-Party (i.e., a Device manufacturer) to create, amend, and update a SDD of a Device. It also allows either a 2nd-Party, or a 3rd-Party, or both Parties, to create, amend, and update a SDD of a Device.

In some non-limiting embodiments, a priority scheme is used to determine which Party could overwrite another Party's SDD of a Device.

In some non-limiting embodiments, a Vetting Process is used to determine when a SDD of a Device will become publicly (officially) available in the Platform.

In some non-limiting embodiments, an IP also employs Event Variable(s) or/and Notification Variable(s).

In some non-limiting embodiments, an IP also employs I-SDD Creation.

In some non-limiting embodiments, an IP also employs a Visual Programming.

In some non-limiting embodiments, the Visual Programming employs Trigger.

In some non-limiting embodiments, an IP employs a notion of Permit for security and protection. The Platform enforces such a notion throughout the system.

In some non-limiting embodiments, an IP also employs the notion of Owner.

In some non-limiting embodiments, an IP also employs the action of Issuing.

In some non-limiting embodiments, an IP also employs the action of Granting.

In some non-limiting embodiments, an Ownership could be a Joint-Ownership when there is more than one Owner to an I-SDD. Depending on the type of Joint-Ownership, a Joint-Ownership effectively executes as one Owner, if and only if, but not limited to, when (a) all owners agreed, or (b) majority owners agreed, or (c) any one of the owners agreed, otherwise, the execution (attempt to access the I-SDD) will be rejected by the Platform.

In some non-limiting embodiments, Multiple Owners of an I-SDD could be the result of Granting.

In some non-limiting embodiments, an IP also employs Permit Obtaining and Checking.

The disclosed embodiments contemplate and provide, among other features and without limitation, any and all combinatorial possibilities of the above.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EMBODIMENTS

Figure 1:
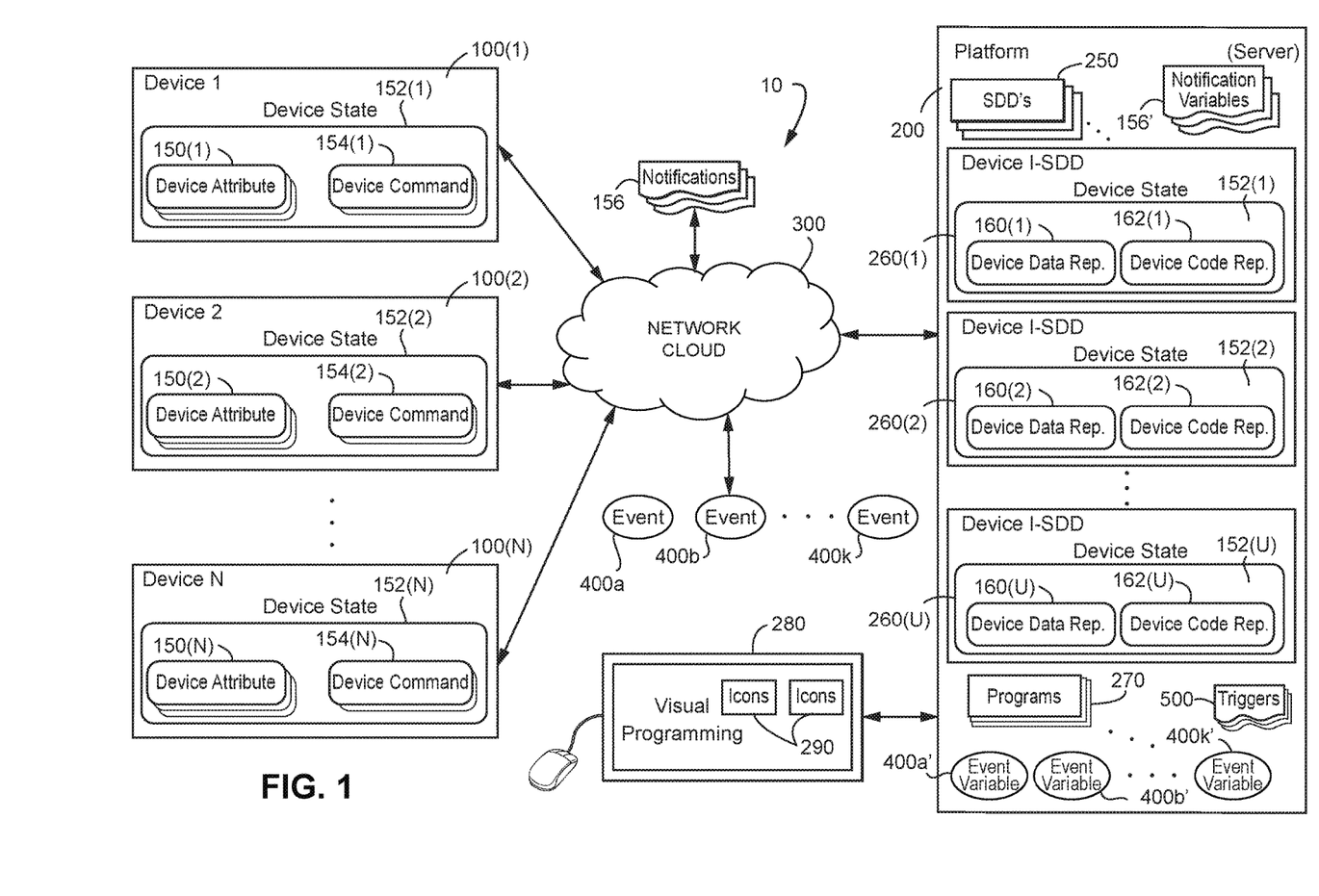
FIG. 1 is a block diagram of an example non-limiting system.
Figure 2:
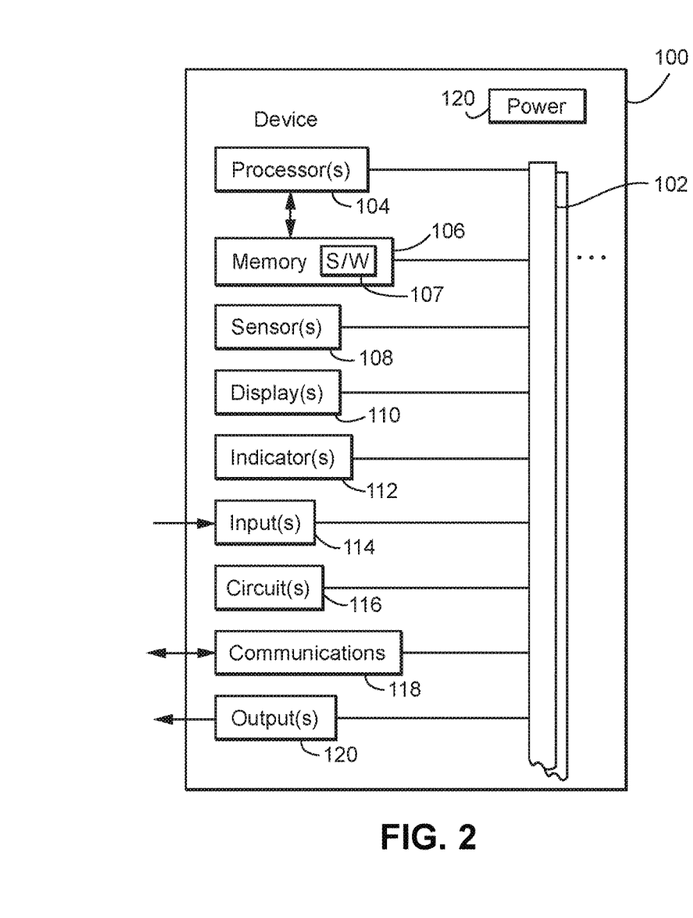
FIG. 2 is a block diagram of an example non-limiting Device.
Figure 4A:
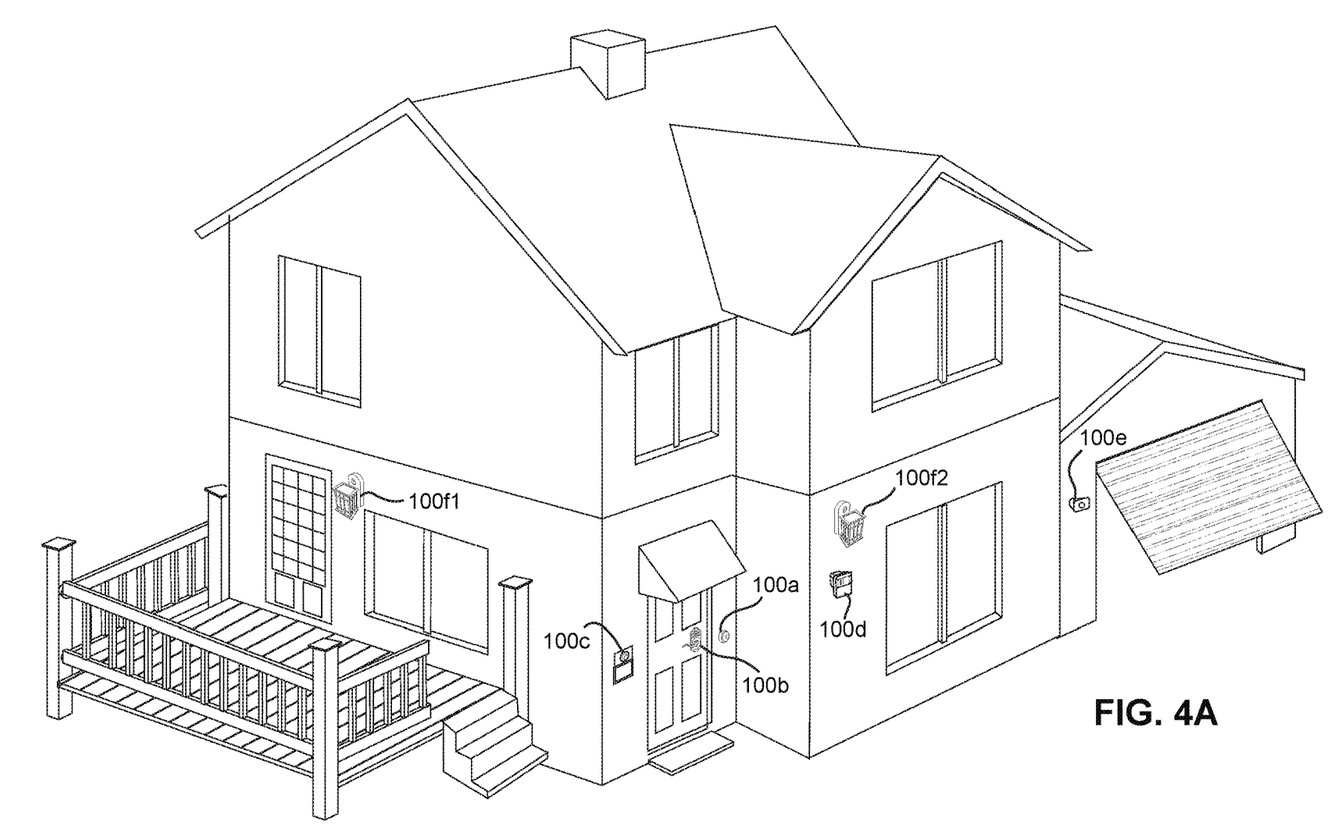
FIGS. 4A and 4B show an example application.

FIG. 1 shows an example system 10 including one or more Devices 100 and a Platform 200. Each Device 100 is a thing made of or adapted for a particular purpose, especially a piece of mechanical or electronic equipment. It usually consists of, but not limited to, or a subset of, circuits, processors, memory, sensors, LED, LCD, display, chips, knobs, switches, battery, solar cell, etc. (see FIG. 2) There can be any number N of Devices 100. See FIG. 4A for non-limiting examples of Devices 100.

Device State 152

Each Device 100 has a Device State 152—which means the particular condition of interest, and/or mode of interest, that the Device is in at a particular time. To a User, it also means the collected state of the set of Device Attributes 150 or/and Device Commands 154 of interest of the Device 100 at a particular time. Thus, a Device 100, from the User point of view, usually consists of a set of Device Attributes 150 or/and Device Commands 154.

Device Attribute 150

A Device Attribute 150 is a feature, or quality, of interest regarded as a characteristic, or inherent part, of a device. For example, it could be, but not limited to, a knob, a button, an on/off switch, a meter, a meter for pressure, a sensor for motion, a programmable sequencer, a timer, a status indicator, a controller joystick, a readout screen, or a slider, etc.

Device Command 154

A Device Command 154 gives a device 100 an order to do something, or perform certain function; or, reversely, a device 100 reports state changes, or/and issues a device command 154, to a computer software, or other devices. For example, it could be, but not limited to, read meter, write status register, set on, set off, signal the-limit-is-reached, etc.

Platform 200

Figure 3:
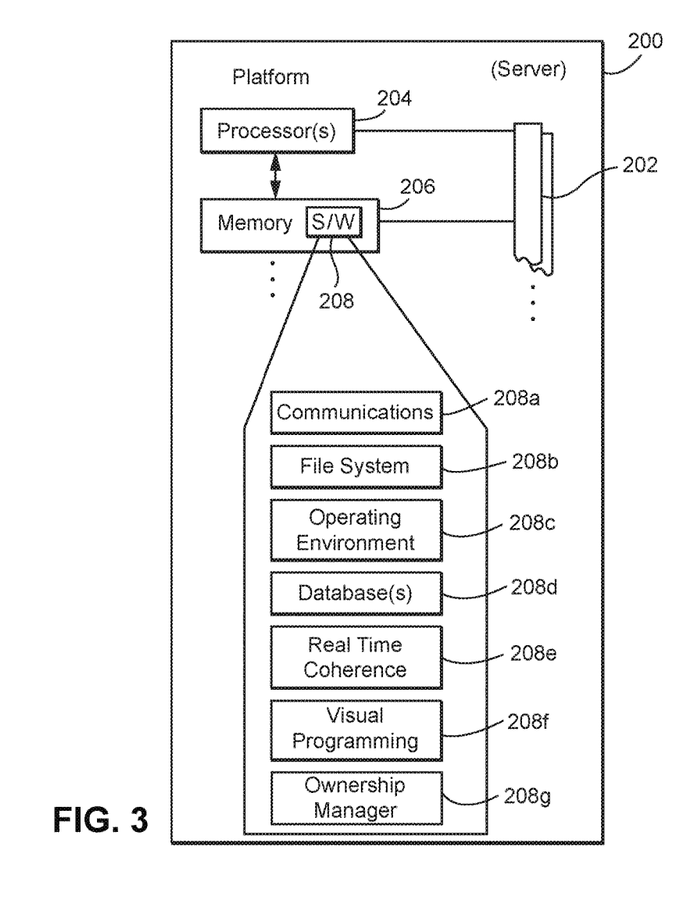
FIG. 3 is a block diagram of an example non-limiting Platform.

FIG. 1 also shows a Platform 200. Platform 200 is a major piece of software, as an operating environment, and/or operating environment in the cloud, and/or a database, and/or a database in the cloud, under which various software programs, and applications can be designed to run within, obeying its constrains and rules, and making use of its facilities, by many different users. See FIG. 3. In this context, a Program means, a computer program, a sequence of instructions, that a computer can interpret and execute, that tell a computer what to do. A Computer Program is written in a programming language, which has syntactic rules to govern how a program is allowed to form from one or more lexical tokens.

SDD's 250

Platform 200 supports Software-Defined Devices ("SDD's") 250. An SDD 250 is a computer software representation, to a User, of a Device 100, or of a subset of a Device, or of a derivative of a Device, or of an abstraction of a Device, in such a way that computer programs can use, reference, and interpret.

An SDD 250 could consist of "Device Data Representation" 160 and "Device Code Representation" 162, or could just have Device Data Representation 160.

A Device Data Representation 160 is a computer programming representation of a Device State 152 of interest. It could consist of, but not limited to, Variables representing Device Attributes 150 and/or Device Commands 154. Through these Variables, a Device State of interest could be interacted, manipulated, controlled, referenced, or used. In this context, a Variable means a place holder in the computer storage, such as memory or/and disk. It is defined within the rules of the employed computer language, or a group of related programs, or an operating environment, or the Platform. The interpretation of the content in a Variable is performed according to the data type declaration, such as integer, floating point, character string, pointer, record, variable-length record, etc., of the particular computer language used, or/and a cluster of related programs, or/and the particular operating environment, or/and the Platform 200. The lifespan of a Variable could be within the lifespan of a program, or a group of related programs, or the operating environment, or the Platform 200.

A SDD 250 could also consist of programming codes ("Device Code Representation 162") which extract from a selected set of Device Attributes 150, or/and Device Commands 154, on a Device 100 and transform them into the corresponding Device Data Representation. Reversely, Device Code Representation 162 could also extract the Values from a selected set of Device Data Representation(s) 160 and transform them into the corresponding Device Attributes 150 or/and Device Commands 154. Thus, it transforms to and from in between a Device 100 and the corresponding Device Data Representation 160. In this context, a Value means the interpreted content of a Variable, based on its declared data type of the employed language, or a group of related programs, or/and the operating environment, or/and the Platform 200.

A Device 100 may have more than one SDD 250, if so desired. A SDD 250 could be an abstraction of another SDD, or a group of SDDs.

Figure 6:
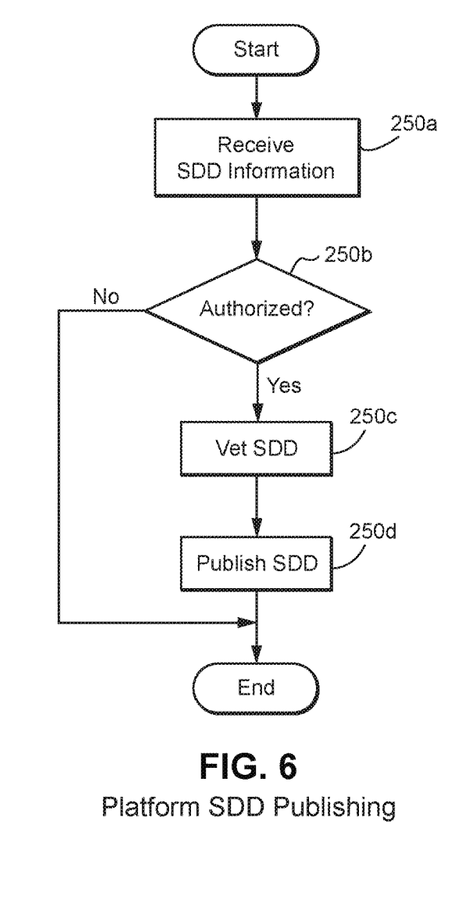

FIG. 6 shows an example of publishing an SDD 250. The Platform 200 receives a SDD Information (250a) and determines whether the attempt to publish is authorized (205b). If authorized, the Platform vets the SDD 250 (250c). The Vetting Process means the act and a particular process of making a prior examination and critical appraisal of something of particular interest. Once vetted, the SDD 250 is published (250d). In the context of Vetting, $1^{st}$ Party means the Device manufacturer, $2^{nd}$-Party—means the Platform operator, and $3^{rd}$-Party—means a User of the Platform. Different Vetting privileges could apply to different Parties, such as, but not limited to, the $1^{st}$-Party can over write the $2^{nd}$-Party, and the $2^{nd}$-Party can over write the $3^{rd}$-Party.

I-SDD's 260

FIG. 1 also shows Instances of SDDs ("I-SDDs") 260. I-SDD 260 is an instantiation of a SDD 250, or an instantiation of the Device Data Representation 160 of a SDD, of a particular Device 100. At any given time, the Values of the Variables in Device Data Representation 160 of an I-SDD 260 (of the corresponding Device 100 in the Platform 200) shall reflect, or be the best estimated of, the Device State 152 of interest of a corresponding Device 100.

Figure 4B:
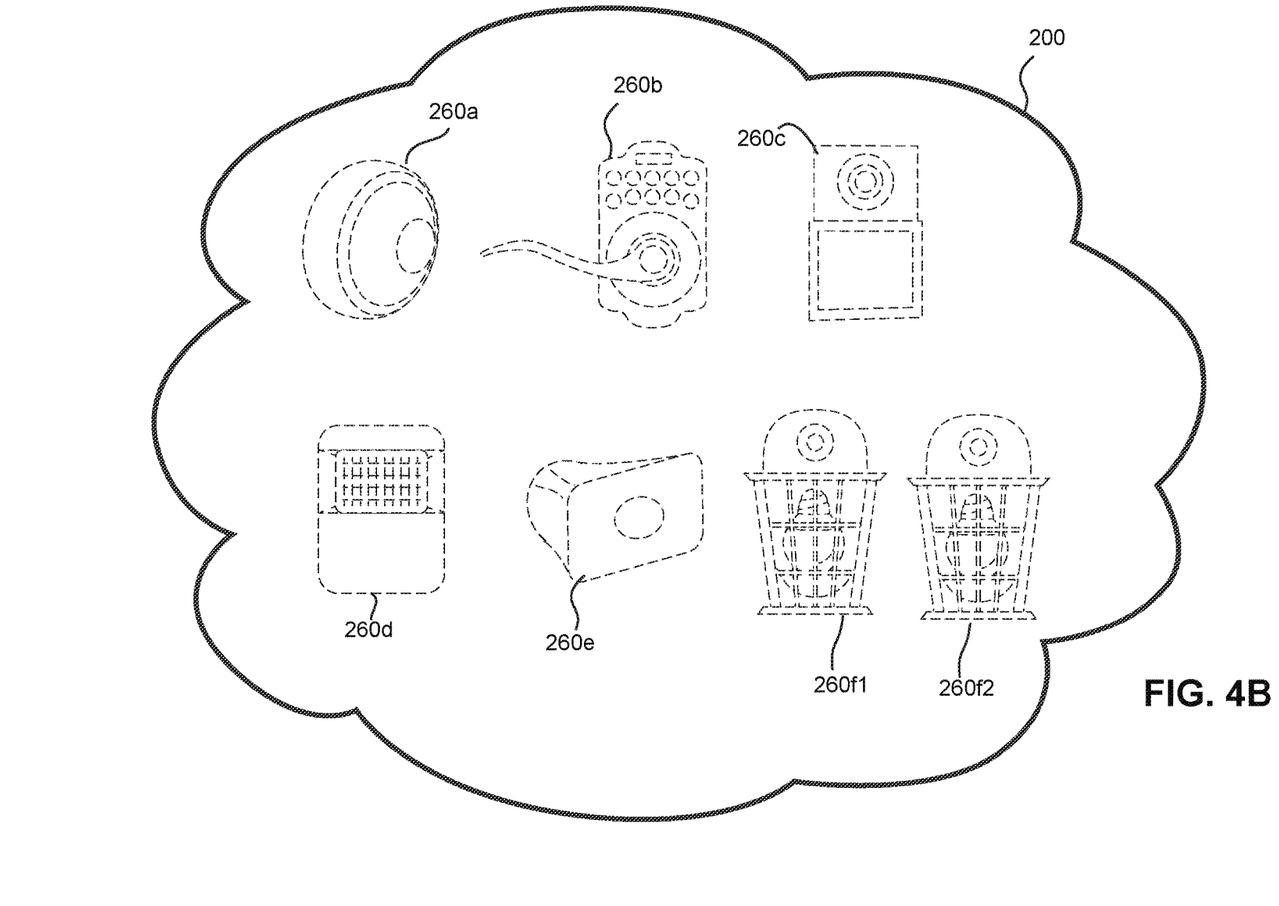

Thus, these I-SDDs 260 are independent from one another of the Devices 100 with the same SDD 250 (for example: having the same manufacture and model, but different physical Devices with different serial numbers). Different Devices 100 possess their own instantiations of the SDD 250. See FIG. 4B showing non-limiting examples of I-SDD's 260 corresponding to Devices 100 of FIG. 4A.

The Platform 200 will use the best efforts to mirror the Values of an I-SDD 260 to its corresponding Device State 152 of interest, once a Device is registered, bounded, mapped, or associated with a SDD 250 in the Platform, whenever this Device 100 is connected, directly or indirectly, to the Platform. When this Device 100 is disconnected, directly or indirectly, but not deleted, a best estimation of the Values of an I-SDD 260 could be used by the Platform 200.

Thus, as far as a programmer or an application on the Platform 200 is concerned, the corresponding I-SDD 260 of a Device 100 is the software representation, or reincarnation, of the Device 100 (or, group of Devices), or the best estimation of the Device (or, group of Devices), or the best derivative of the Device (or, group of Devices), or the best abstraction of the Device (or, group of Devices). It means that the Values of a set of Variables in an I-SDD 260 shall reflect the Device State 152 of interest at any given time; vice versa, it also means whenever the Value of a Variable in I-SDD is changed, it could cause the Device 100 to change to a different Device State 152.

Figure 1A:
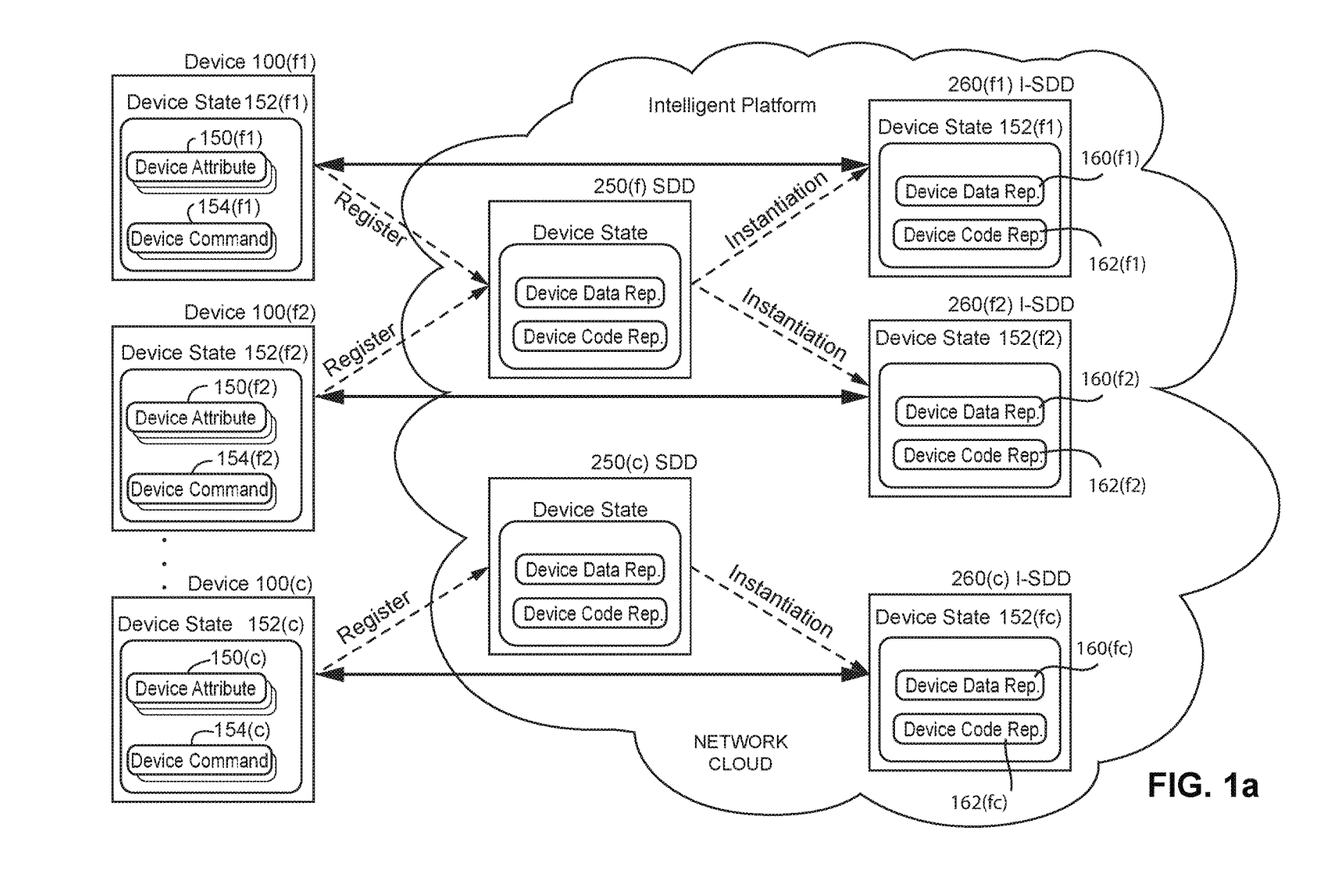
FIG. 1a shows example relationships between Devices, SDD's and I-SDD's.

An I-SDD 260 of a corresponding Device 100 will be created, kept, and maintained in the Platform 200 whenever a Device 100 is registered, and subscribed into the Platform. See FIG. 1a. It also means a set of Values (of Variables in I-SDD 260) will be initialized, kept, and maintained at any given time in the I-SDD to reflect the Device State 152 of interest of this particular Device 100. FIG. 1 shows I-SDDs 260(1)-260(U) where U>=N since there could be more than one I-SDD per Device 100.

Events 400

Events 400 means something, especially something of importance, happens, which is external to the device such as, but not limited to, temperature, time of date, altitude and longitude, a phone call occurs, when a phone call occurs, etc., or is derived in conjunction with a device, another device, a collective set of devices, or/and Platform facilities, such as, but not limited to, location, proximity, time zone, country, population, or weather, etc.

Event especially means changes or activities that are not controllable within the abilities of a Platform, e.g., turning on/off of weather, or controlling an earthquake.

An Event Variable 400'—means an Event 400, or a derivation of an Event (or Events), or a derivation of an Event (or Events) of interest, or a derivation of the history of an Event (or Events) of interest, is defined, represented, reincarnated, as a Variable in the Platform 200.

The Platform 200 will use the best efforts to mirror, reflect, assimilate, derive the Value of an Event Variable 400' to its corresponding Event (or Events) 400 or/and Platform facilities.

Notifications 156

Notification 156 is a type of message such as, but not limited to, text strings, sent to a device 100 by a software application in the Platform 200, or from a Device, or from outside of the Platform through a Network Cloud 300. A User could receive many Notifications 156, from various applications, on a Device 100 owned or used by the User. Notification 156 usually, but not limited to, is sent without a specific request from the client.

Notification Variables 156'—mean a Notification (or Notifications), or the derivation of a Notification (or group of Notifications) such as, but not limited to, whether a string of defined characters is matched, or the derivation of the relevant history of the Notification 156 (or, group of Notifications) such as, but not limited to, how many times a Notification 156 (or Notifications) being sent by a particular person, or by a particular software application, is represented, or reincarnated, as a Variable in the Platform 200.

The Platform 200 will use the best efforts to mirror, reflect, assimilate, derive the Value of a Notification Variable to its corresponding Notification (or Notifications) or/and Platform facilities.

Triggers 500

Triggers 500 means whenever the Value of an Variable of interest in an I-SDD 260, or Event Variables, or Notification Variables, changes, it causes the affected Programs (i.e., Programs use this Variable, or/and waiting on this Variable, or/and are related to this particular Variable) to be executed by the Platform 200 in a manner within the rules of the Platform, or/and by the programmable control of a user. The User function of Trigger 500 could be, but not limited to, designed as a language construct, or a function call in the runtime library, or a system/Platform call in the Platform 200.

Figure 5:
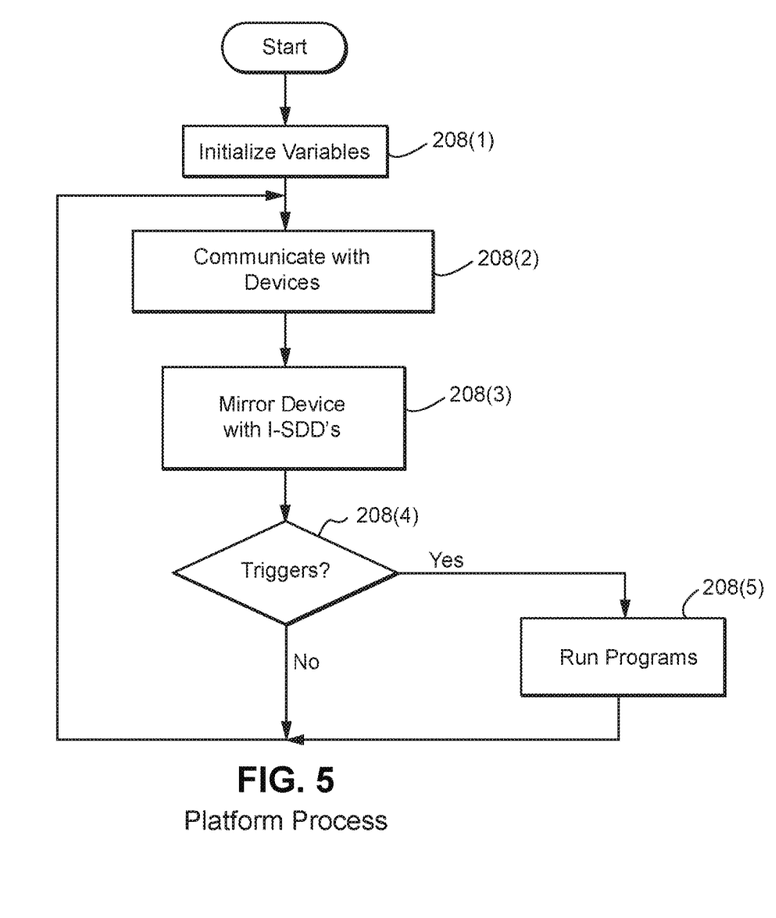
FIGS. 5 and 6 are example non-limiting Platform processes.

FIG. 5 shows an example non-limiting Platform process that uses Triggers 500. The Platform 200 initializes Variables (208(1)) and then communicates with Devices 100 (208(2)). The Platform 200 mirrors each Device 100 with one or more corresponding I-SDDs 260 (208(3)). The Platform 200 then detects if there are any applicable Triggers 500 (208(4)). If there are, the Platform 200 runs appropriate Programs (208(5)) as described above.

Visual Programming 280

Some of the software programs and applications that execute on Platform 200 can be created using Visual Programming 280. Visual Programming 280 means a Program is put together by stitching one or more Icons together, in one, two-, or three-dimensional space, in accordance with the language rules of the programming language. In this context, an icon means a graphical symbol that represents a programming language construct. A language construct could mean a language construct, a component of a construct, or a collection of components of a construct, or a collection of constructs. Usually, a distinct Icon, such as, but not limited to, by shape, or/and color, or/and shade, or/and stenciled symbolic name stenciled on the shape, etc., is designed for a particular construct of interest. Furthermore, the editor for a Visual Programming usually has the capabilities to allow a programmer, through drag and drop, to insert, remove, manipulate placement of Icons in accordance with the rules of the employed language, in turns, to form a Program.

Example Security & Protection

Protected Object is an object of interest, in the Platform 200, which the Platform wants to protect and secure. For example, it could be, but not limited to, a User, a User's private data, or/and the Variable(s) of an I-SDD 260, or/and an I-SDD, or/and Event Variables, or/and Notification Variables, or/and a physical Device 100. In this context, a User is a user of the Platform.

Permit

To protect the Objects in a system, a system in general uses (1) predefined address-space privileges, or so called hierarchical protection domains, such as Unix, Linux, etc. Depending on the type of user, they are pre-assigned a privilege to access the (1) permitted address-space(s) and the objects in the permitted address-space(s) and/or (2) access-control list associated with an object, such as a commercial database. The access-control list is associated with an Object, not the user. When a program tries to access such an Object, the system checks what the user's privilege is in the access-control list to decide whether the access shall be granted.

In a Platform 200 using Permits, a program obtains the Permit from the User's Permit List and, in turn, uses the obtained Permit to reference/access the object in accordance with the rights that are specified by that Permit. In principle, there are many similarities between Permit and Capability (of a Capability-based system). See e.g., https://en.wikipedia.org/wiki/Capability-based security, incorporated herein by reference.

Figure 9:
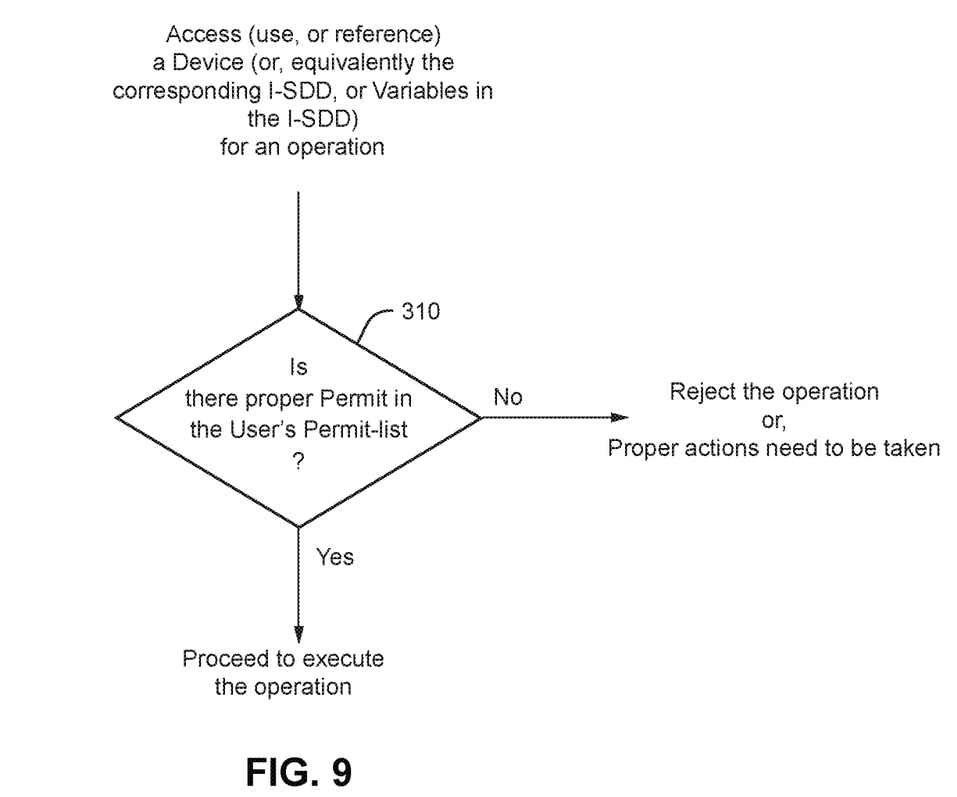
FIG. 9 shows another example Permit process.

A User needs a proper Permit to access (i.e., use, manipulate, or reference) a Protected Object in the Platform 200. See FIG. 9. Without a proper Permit, the Platform 200 prohibits a User, or a Program (or a segment of a Program) on behalf of the User, to access/use/manipulate/reference a Protected Object of interest ("No" exit to FIG. 9 decision block). The Platform 200 maintains a List of Permits for each User.

Owner (Ownership)

Figure 7:
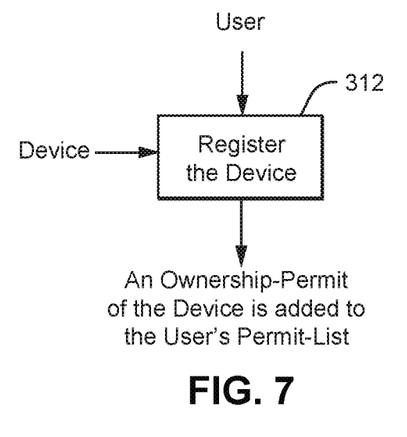
FIG. 7 shows an example Device registration process.

The very first User who first bonds/registers a physical Device 100 into the Platform 200, in turn, becomes the owner of the resulting I-SDD 260, i.e., the software representation of the corresponding Device of interest. See FIG. 7.

Issue

Figure 8:
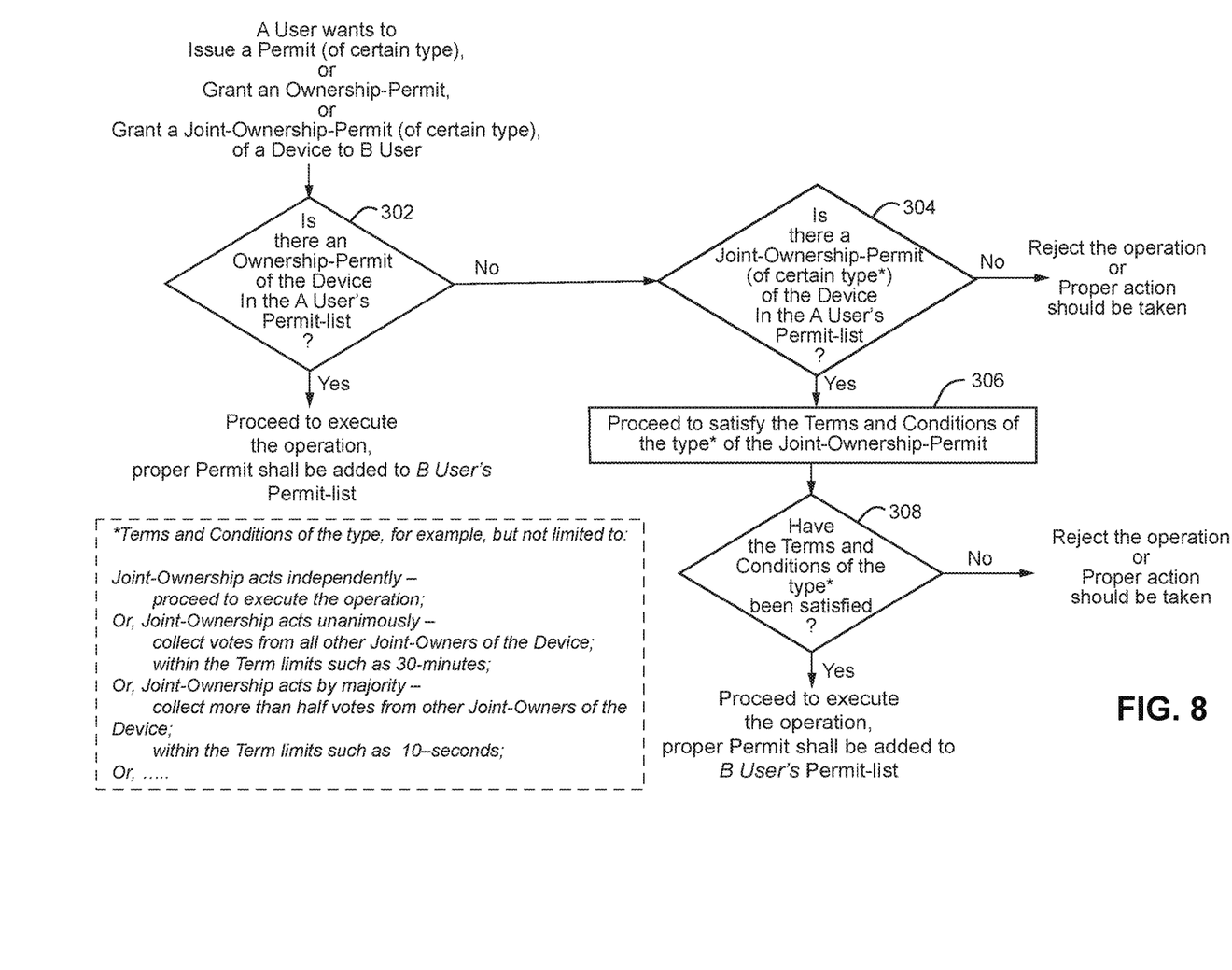
FIG. 8 shows an example Permit process.

An Owner, or a software on the behalf of the Owner, of an I-SDD 260 can Issue, or respond to a valid request to Issue, a Permit to a User in the Platform 200 to access, to use, to manipulate, to reference, the I-SDD in a manner allowed by the type of the issued Permit. FIG. 8 shows examples.

Grant

An Owner, or a software on the behalf of the Owner, of an I-SDD 260 can Grant, or respond to a valid request to Grant, the Ownership of the I-SDD to another User; as a consequence, the Ownership changes. The Grantor could lose the Ownership of the I-SDD 260 to the Grantee, or could become a Joint-Owner (Joint-Ownership), with the Grantee, of the I-SDD.

Permit Obtaining and Checking

A Permit shall be obtained from a User, or a software on the User's behalf, and checked (i.e., at every instance of a Program execution at any given time) before an I-SDD 260 is accessed or referenced each and every time. For example, if a Program tries to access an I-SDD 260 in two different times, before each access, a proper Permit from the User, or a software on the User's behalf, has to be obtained and checked; in other words, a proper Permit shall be obtained and checked for the first access, and it shall be obtained and checked again for the second access.

In the FIG. 8 example, User A wants to Issue a Permit (of certain type) or Grant an Ownership-Permit, or Grant a Joint-Ownership-Permit (of certain type), of a Device to User B. The Platform 200 determines if there is an Ownership-Permit of the Device in the A User's Permit-list (decision block 302). If there is an Ownership-Permit of the Device in the A User's Permit-list. ("Yes" exit to decision block 302), the Platform 200 proceeds to execute the operation; and a proper Permit shall be added to B User's Permit-list.

If there is not an Ownership-Permit of the Device in the A User's Permit-list ("No" exit to decision block 302), the Platform 200 determines if there is a Joint-Ownership-Permit (of certain type) of the Device in the A User's Permit-list (decision block 306).

If the Platform 200 determines there is not a Joint-Ownership-Permit (of certain type) of the Device in the A User's Permit-list ("No" exit to decision block 306), the Platform rejects the operation or proper action should be taken.

If the Platform 200 determines there is a Joint-Ownership-Permit (of certain type) of the Device in the A User's Permit-list ("Yes" exit to decision block 306), the Platform proceeds to satisfy the Terms and Conditions of the type of the Joint-Ownership-Permit. In this context, the Terms and Conditions of the type for example may include but not be limited to:

Joint-Ownership acts independently —proceed to execute the operation,

Or, Joint-Ownership acts unanimously—collect votes from all other Joint-Owners of the Device; within the Term limits such as 30-minutes, Or, Joint-Ownership acts by majority—collect more than half votes from other Joint-Owners of the Device; within the term limits such as 10-seconds, Or, . . . .

The Platform 200 then determines whether the Terms and Conditions of the type have been satisfied (decision block 308). If they have not been satisfied ("No" exit), the Platform 200 rejects the operation or proper action should be taken. If the Terms and Conditions of the type have been satisfied ("Yes" exit of decision block 308), the Platform proceeds to execute the operation, and adds the proper Permit to the B User's Permit-list.

The invention is not to be limited to the disclosed embodiments, but on the contrary, is intended to cover various modifications and equivalent arrangements included within the spirit and scope of the claims.

Glossary/Definitions

Applicant intends to be his own lexicographer with respect to the following definitions which will apply to (and only to) the capitalized following terms (i.e., those with an initial letter that is capitalized). These definitions will not apply to the same terms that do not begin with a capital letter. For example, "User" is a defined term whereas "user" is not a defined term.

| Defined Term: | Definition: |
|---|---|
| "1st-Party" or "First Party" | the Device manufacturer |
| "2nd-Party" or "Second Party" | a Platform operator |
| "3rd-Party" or "Third Party" | a user of the Platform |
| "Device Attribute" | a feature, or quality, of interest regarded as a characteristic, or inherent part, of a device. For example, a Device Attribute could be, but not limited to, a knob, a button, an on/off switch, a meter, a meter for pressure, a sensor for motion, a programmable sequencer, a timer, a status indicator, a controller joystick, a readout screen, or a slider, etc. |
| "Device Code Representation" | A SDD could also consist programming codes ("Device Code Representation") which extract from a selected set of Device Attributes, or/and Device Commands, on a Device and transform them into the corresponding Device Data Representation. Reversely, Device Code Representation could also extract the Values from a selected set of Device Data Representation and transform them into the corresponding Device Attributes or/and Device Commands. Thus, it transforms to and from (in between) a Device and the corresponding Device Data Representation. |
| "Device Data Representation" | a computer programming representation of a Device State of interest. It could consist of, but not limited to, Variables representing Device Attributes and/or Device Commands. Through these Variables, a Device State of interest could be interacted, manipulated, controlled, referenced, or used. |
| "Device Command" | to give a device an order to do something, or perform a certain function(s); or, reversely, a device reports state changes, and/or issues a device command, to a computer software, or other device(s). For example, it could be, but not limited to, read meter, write status register, set on, set off, signal the-limit-is-reached, etc. |
| "Device State" | the particular condition of interest, and/or mode of interest, that a Device is in at a particular time. To a User, it also means the collected state of the set of Device Attributes or/and Device Commands of interest of the Device at a particular time. |
| "Device" | a thing made of or adapted for a particular purpose, especially a piece of mechanical or electronic equipment. It usually consists of, but is not limited to, or a subset of, circuit(s), processor(s), memory(ies), sensor(s), LED(s), LCD(s), display(s), chip(s), knob(s), switch(es), battery(ies), solar cell(s), etc. A Device, from the User point of view, usually consists of a set of Device Attributes or/and Device Commands. |

| Defined Term: | Definition: |
|---|---|
| "Event Variable" | an Event, or a derivation of an Event (or Events), or a derivation of an Event (or Events) of interest, or a derivation of the history of an Event (or Events) of interest, is defined, represented, or/and reincarnated, as a Variable in the Platform. The Platform will use the best efforts to mirror, reflect, assimilate, derive the Value of an Event Variable to its corresponding Event (or Events) or/and Platform facilities. |
| "Event" | something, especially something of importance, happens, which is external to the device such as, but not limited to, temperature, time of day/date, location (e.g., altitude and latitude/longitude or other geocoordinates), a phone call occurs, when a phone call occurs, etc., or is derived in conjunction with a device, another device, a collective set of devices, or/and Platform facilities, such as, but not limited to, location, proximity, time zone, country, population, or weather, etc. Event especially means changes or activities that are not controllable within the abilities of a Platform, e.g., turning on/off of weather, or controlling an earthquake. |
| "Grant" | An Owner, or a software on the behalf of the Owner, of an I-SDD can Grant, or respond to a valid request to Grant, the Ownership of the I-SDD to another User, as a consequence, the Ownership changes. The Grantor could lose the Ownership of the I-SDD to the Grantee, or could become a Joint-Owner (Joint-Ownership), with the Grantee, of the I-SDD. |
| "Icon" | a graphical symbol that represents a programming language construct. A language construct could mean a language construct, a component of a construct, or a collection of components of a construct, or a collection of constructs. Usually, a distinct Icon, such as, but not limited to, by shape, or/and color, or/and shade, or/and symbolic name stenciled on the shape, etc., is designed for a particular construct of interest. |
| "An Instance of a SDD" ("I-SDD") | an instantiation of a SDD, or an instantiation of the Device Data Representation of a SDD, of a particular Device. At any given time, the Values of the Variables in Device Data Representation of an I-SDD (of the corresponding Device in the Platform) shall reflect, or be the best estimate of, the Device State of interest of a corresponding Device. Thus, these I-SDDs are independent from one another of the Devices with the same SDD (for example: having the same manufacture and model, but different physical Devices with different serial numbers). Different Devices possess their own instantiations of the SDD. The Platform will use the best efforts to mirror the Values of an I-SDD to its corresponding Device State of interest, once a Device is registered, bounded, mapped, or associated with a SDD in the Platform, whenever this Device is connected, directly or indirectly, to the Platform. When this Device is disconnected, directly or indirectly, but not deleted, a best estimation of the Values of an I-SDD could be used by the Platform. Thus, as far as a programmer or an application on the Platform is concerned, the corresponding I-SDD of a Device is the software representation, or reincarnation, of the Device (or, group of Devices), or the best estimation of the Device (or, group of Devices), or the best derivative of the Device (or, group of Devices), or the best abstraction of the Device (or, group of Devices). It means that the Values of a set of Variables in an I-SDD shall reflect the Device State of interest at any given time; vis versa, it also means whenever the Value of a Variable in I-SDD is changed, it could cause the Device to change to a different Device State. |
| "I-SDD Creation" | an I-SDD of a corresponding Device will be created, kept, and maintained in the Platform whenever a Device is registered, or/and subscribed into the Platform. It also means a set of Values (of Variables in I-SDD) will be initialized, kept, and maintained at any given time in the I-SDD to reflect the Device State of interest of this particular Device. |
| "Intelligent Platform" ("IP") | comprises a Platform that employs an I-SDD where the Values of a set of Variables in an I-SDD shall reflect the Device State of interest at any given time and vis versa so that whenever the Value of a Variable in the I-SDD is changed, it could cause the Device to change to a different Device State. In this context, an I-SDD is an instantiation of a SDD, or an instantiation of the Device Data Representation of a SDD, of a particular Device. In this context, a Software-Defined Device ("SDD") means a computer software representation, to a User, of a Device, or of a subset of a Device, or of a derivative of a Device, or of an abstraction of a Device, in such a way that computer programs can use, reference, and interpret. |
| "Issue" | an Owner, or a software on the behalf of the Owner, of an I-SDD can Issue, or respond to a valid request to Issue, a Permit to a User in the Platform to access, to use, to manipulate, or/and to reference, the I-SDD in a manner allowed by the type of the issued Permit. |
| "Joint Ownership" | when there is more than one Owner to a Protected Object. A group of Joint Owners effectively executes as one Owner, depending on the type of Joint Ownership, if and only if, when (a) all Owners agreed, or (b) a majority of the Owners agreed, or (c) any one of the Owners agreed; otherwise, the execution (attempt to access the Protected Object, or Grant an Ownership, or Issue a Permit) will be rejected by the Platform. |

| Defined Term: | Definition: |
|---|---|
| "Notification Variable" | a Notification (or Notifications), or the derivation of a Notification (or group of Notifications) such as, but not limited to, whether a string of defined characters is matched, or the derivation of the relevant history of the Notification (or, group of Notifications) such as, but not limited to, how many times a Notification (or Notifications) being sent by a particular person, or by a particular software application, is represented, or reincarnated, as a Variable in the Platform.<br>The Platform will use the best efforts to mirror, reflect, assimilate, or/and derive the Value of a Notification Variable to its corresponding Notification (or Notifications) or/and Platform facilities. |
| "Notification" | a type of message such as, but not limited to, text strings, sent to a device by a software application in the Platform, or from a Device, or from outside of the Platform through a Network Cloud. A User could receive many Notifications, from various applications, on a Device owned or used by the User. Notification usually, but not limited to, is sent without a specific request from the client. |
| "Owner" (Ownership) | The very first User who first bonds/registers a Device into the Platform, in turn, this User becomes the owner of the resulting I-SDD, i.e., the software representation of the corresponding Device of interest. |
| "Permit" | To protect the Objects in a system, a system in general uses (1) predefined address-space privileges, or so called hierarchical protection domains, such as Unix, Linux. Depending on the type of user, they are pre-assigned a privilege to access the permitted address-space(s) and the objects in the permitted address-space(s), or (2) access-control list associated with an object, such as a commercial database. The access-control list is associated with an Object, not the user. When a program tries to access such an Object, the system checks what the user's privilege is in the access-control list to decide whether the access shall be granted.<br>In a Platform using Permits, a program obtains the Permit from the User's Permit List, in turn, uses the obtained Permit to reference/access the object in accordance with the rights that are specified by that Permit. In principle, there are many similarities between Permit and Capability (of a Capability-based system).<br>A User needs a proper Permit to access (i.e., use, manipulate, or/and reference) a Protected Object in the Platform. Without a proper Permit, the Platform prohibits a User, or a Program (or a segment of a Program) on behalf of the User, from access/use/manipulate/reference of a Protected Object of interest. The Platform maintains a List of Permits for each User. |
| "Permit Obtaining and Checking" | Permits shall be obtained from a User and checked (i.e., every instance of a Program execution at any given time) before an I-SDD is accessed or referenced each and every time. For example, if a Program tries to access an I-SDD at two different times, before each access, a proper Permit from the User has to be obtained and checked; in other words, a proper Permit shall be obtained and checked for the first access, and it shall be obtained and checked again for each of the second and subsequent accesses. |
| "Platform" | a major piece of software, such as an operating environment, and/or operating environment in the cloud, and/or a database, and/or a database in the cloud, under which various software programs, and applications can be designed to run within, obeying its constraints and rules, and making use of its facilities, by many different users. |
| "Program" | a computer program, a sequence of instructions, that a computer can interpret and execute, that tell a computer what to do. A Computer Program is written in a programming language, which has syntactic rules to govern how a program is allowed to form from one or more lexical tokens. |
| "Protected Object" | An object of interest, in the Platform, which the Platform wants to protect. For example, it could be, but not limited to, a User, a User's private data, or/and the Variable(s) of an I-SDD, or/and an I-SDD, or/and Event Variables, or/and Notification Variables, or/and a physical Device. |
| "Software-Defined Device" ("SDD") | a computer software representation, to a User, of a Device, or of a subset of a Device, or of a derivative of a Device, or of an abstraction of a Device, in such a way that computer programs can use, reference, and interpret. A SDD could consists of Device Data Representation and Device Code Representation, or could just have Device Data Representation.<br>A Device may have more than one SDD, if so desired. A SDD could be an abstraction of another SDD, or a group of SDDs. |
| "Trigger" | whenever the Value of a Variable of interest in an I-SDD, or Event Variables, or Notification Variables, changes, it causes the affected Programs (i.e., Programs use this Variable, or/and waiting on this Variable, or/and are related to this particular Variable) to be executed by the Platform in a manner within the rules of the Platform, or/and by the programmable control of a user. The User function of Trigger could be, but not limited to, designed as a language construct, or a function call in the runtime library, or a system/Platform call in the Platform. |
| "User" | A user of the Platform |
| "Value" | the interpreted content of a Variable, based on its declared data type of the employed language(s), or a group of related programs, or/and the operating environment, or/and the Platform. |

| Defined Term: | Definition: |
|---|---|
| "Variable" | a place holder in non-transitory computer storage, such as memory and/or disk. "Variable" is defined within the rules of an employed computer language(s), a group of related programs, or an operating environment, or a Platform. The interpretation of the content in a Variable is performed according to the data type declaration, such as integer, floating point, character string, pointer, record, variable-length record, etc., of the particular computer language(s) used, or/and a cluster of related programs, or/and the particular operating environment, or/and the Platform. The lifespan of a Variable could be within the lifespan of a program, or a group of related programs, or the operating environment, or the Platform. |
| "Vetting Process" | the act and a particular process of making a prior examination and critical appraisal of something of particular interest. For example, a Vetting Process is used to determine when a SDD of a Device will become publicly (officially) in the Platform. |
| "Visual Programming" | a Program is put together by stitching one or more Icons together, in one, two-, or three-dimensional space, in accordance with the language rules of the programming language. Furthermore, the editor for a Visual Programming usually has the capabilities to allow a programmer, through drag and drop, to insert, remove, or/and manipulate placement of Icons in accordance with the rules of the employed language, in turns, to form a Program. |

The invention claimed is:

1. A system including at least one processor and memory storing instructions for execution by the at least one processor, the system providing an Intelligent Platform ("IP") comprising:

a Platform employing an instantiation ("I-SDD") of a Software-Defined Device ("SDD") comprising a computer software representation, to a User, of a Device, or of a subset of a Device, or of a derivative of a Device, or of an abstraction of a Device, in such a way that computer programs can use, reference, and interpret, wherein the I-SDD comprises Values, stored in at least one non-transitory computer readable medium operatively coupled to the Platform, of a set of Variables that reflect the Device State of interest at any given time, so that whenever the Value of a Variable in I-SDD is changed, it causes the Device to change to a different Device State, wherein the IP employs a Permit for security and protection and enforces such a Permit throughout the system, wherein the IP also employs Owner wherein the very first User who first bonds/registers a physical Device into the IP becomes the owner of a resulting I-SDD software representation of the corresponding Device of interest.

2. The system of claim 1 wherein the IP also employs the action of Issuing wherein an Owner of an I-SDD can Issue a Permit to an User in the IP to access, to use, to manipulate, to reference, the I-SDD in a manner allowed by the type of the issued Permit.

3. The system of claim 2 wherein the IP further qualifies a Permit by at least one additional Term and/or Condition.

4. The system of claim 1 wherein the IP also employs the action of Granting wherein an Owner of an I-SDD can Grant the Ownership of the I-SDD to another User, as a consequence, the Ownership changes.

5. The system of claim 1 wherein an Ownership could be a Joint-Ownership when there is more than one Owner to an I-SDD, and wherein a Joint-Ownership effectively executes as one Owner, depending on the type of Joint-Ownership, if and only if, but not limited to, when (a) all owners agreed, or (b) majority owners agreed, or (c) any one of the owners agreed, otherwise, the IP will reject execution or other attempt to access the I-SDD.

6. The system of claim 1 wherein the Term and/or Condition comprises at least one of the following:

Permit will be terminated after a certain time-limit,

Permit will be terminated after occurrence(s) of certain event(s), and/or

Permit will be terminated after certain occurrence(s) of certain event(s).

7. A method of operating an Intelligent Platform ("IP") comprising:

employing an instantiation ("I-SDD") of a Software-Defined Device ("SDD") comprising a computer software representation, to a User, of a Device, or of a subset of a Device, or of a derivative of a Device, or of an abstraction of a Device, in such a way that computer programs can use, reference, and interpret, wherein the I-SDD comprises Values, stored in at least one non-transitory computer readable medium and operatively coupled to the Platform, of a set of Variables that reflect the Device State of interest at any given time, so that whenever the Value of a Variable in I-SDD is changed, it causes the Device to change to a different Device State, and employing Permit Obtaining and Checking wherein the Permit shall be obtained from a User and checked at every instance of a Program execution at any given time before an I-SDD is accessed or referenced each and every time.

8. The method of claim 7 wherein a Device has one SDD or more and wherein the SDD is an abstraction of another SDD of the same Device, or a group of SDDs of several Devices.

9. The method of claim 7 further including allowing more than just the 1st-Party to create, amend, and update a SDD of a Device, and also allowing either the 2nd-Party, or the 3rd-Party, or both Parties, to create, amend, and update a SDD of a Device.

10. The method of claim 9 further including using a priority scheme to determine which Party can overwrite another Parties' SDD of a Device during the process of Vetting or publishing the (official) SDD.

11. The method of claim 7 further including using a Vetting Process to determine when a SDD of a Device will become publicly (officially) available in the Platform.

12. The method of claim 7 further including employing an Event Variable(s) or/and Notification Variable(s).

13. The method of claim 7 further including employing I-SDD Creation.

14. The method of claim 7 further including employing Visual Programming.

15. The method of claim 14 wherein the Visual Programming includes employing a Trigger.

16. The method of claim 7 further including employing a Permit for security and protection and enforcing such a Permit throughout the system.

17. A method of operating an Intelligent Platform ("IP") comprising:
   employing an instantiation ("I-SDD") of a Software-Defined Device ("SDD") comprising a computer software representation, to a User, of a Device, or of a subset of a Device, or of a derivative of a Device, or of an abstraction of a Device, in such a way that computer programs can use, reference, and interpret,
   wherein the I-SDD comprises Values, stored in at least one non-transitory computer readable medium and operatively coupled to the Platform, of a set of Variables that reflect the Device State of interest at any given time, so that whenever the Value of a Variable in I-SDD is changed, it causes the Device to change to a different Device State,
   employing a Permit for security and protection and enforcing such a Permit throughout the system, and
   employing an Owner wherein the very first User who first bonds/registers a physical Device into the IP becomes the owner of a resulting I-SDD software representation of the corresponding Device of interest.

18. The method of claim 17 further including employing the action of Issuing wherein an Owner of an I-SDD can Issue a Permit to an User in the IP to access, to use, to manipulate, to reference, the I-SDD in a manner allowed by the type of the issued Permit.

19. The method of claim 17 further including employing the action of Granting wherein an Owner of an I-SDD can Grant the Ownership of the I-SDD to another User, and as a consequence, the Ownership changes.

20. The method of claim 17 wherein an Ownership could be a Joint-Ownership when there is more than one Owner to an I-SDD, and wherein a Joint-Ownership effectively executes as one Owner, depending on the type of Joint-Ownership, if and only if, but not limited to, when (a) all owners agreed, or (b) majority owners agreed, or (c) any one of the owners agreed, otherwise, the IP will reject execution or other attempt to access the I-SDD.

21. A system including at least one processor and memory storing instructions for execution by the at least one processor, the system providing an Intelligent Platform ("IP") comprising:
   a Platform employing an instantiation ("I-SDD") of a Software-Defined Device ("SDD") comprising a computer software representation, to a User, of a Device, or of a subset of a Device, or of a derivative of a Device, or of an abstraction of a Device, in such a way that computer programs can use, reference, and interpret,
   wherein the I-SDD comprises Values, stored in at least one non-transitory computer readable medium and operatively coupled to the Platform, of a set of Variables that reflect the Device State of interest at any given time, so that whenever the Value of a Variable in I-SDD is changed, it causes the Device to change to a different Device State,
   wherein the IP employs a Permit for security and protection and enforces such a Permit throughout the system,
   wherein the IP also employs Permit Obtaining and Checking wherein the Permit shall be obtained from a User and checked at every instance of a Program execution at any given time before an I-SDD is accessed or referenced each and every time.

* * * * *